United States Patent Office 3,154,918
Patented Nov. 3, 1964

3,154,918
GAS TURBINE PLANT
Sven-Olof Kronogård, Goteborg, Sweden, assignor to Ab Volvo, Goteborg, Sweden, a corporation of Sweden
Filed Mar. 12, 1962, Ser. No. 178,884
5 Claims. (Cl. 60—39.16)

The present invention relates to a gas turbine power plant and more particularly to such a plant which includes a gas producer comprising a turbine, a compressor and a combustion chamber, and a further turbine producing useful power, said last mentioned turbine comprising a guide wheel capable of rotating in both directions and a turbine wheel which wheels are mutually connected through a planetary gearing.

An object of the invention is to provide a power plant of this type having a tractive force characteristic particularly suitable for automotive purposes.

Another object of the invention is to provide a plant of high efficiency over a wide speed range.

The invention is explained hereinbelow with reference to the annexed drawing which illustrates an embodiment thereof.

Figure 1:
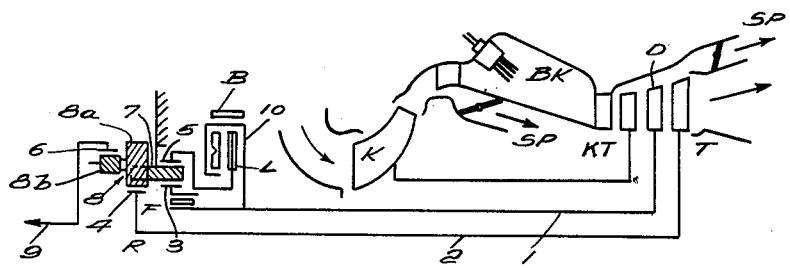
FIG. 1 is a diagrammatic sectional view of a gas turbine power plant according to the invention.

According to FIG. 1 the gas turbine plant comprises a compressor K, a combustion chamber BK and a compressor turbine KT which three elements together form the gas producing unit of the plant. The gases leaving the turbine KT enter a turbine unit comprising a rotatable guide wheel D and a turbine wheel T. The guide wheel D is carried by a tubular shaft 1 and the turbine wheel T is mounted on the shaft 2 passing through the tubular shaft 1. In the embodiment shown the plant is provided with bleedslots SP for air and gas to be used under certain conditions of operation in order to prevent surging of the compressor.

The guide wheel shaft 1 is through a free wheel device F connected to a sun gear 3 and the turbine wheel shaft 2 is directly connected to the sun gear 4, having a smaller diameter than sun gear 3, said sun gears forming parts of a planetary gearing which further consists of two ring wheels 5 and 6 and two sets of planet wheels 7 and 8 journalled in a common stationary planet carrier. The planet wheels 8 are of the stepped type having two portions $8a$ and $8b$ of different diameters, the large diameter portion $8a$ being in mesh with the sun gear 4 as well as with the other planet gear 7. The planet gear 7 also meshes with the sun gear 3 and has therefore a relatively great length. The small diameter portion $8b$ of the planet gear 8 is in mesh with the ring wheel 6 carried by the output shaft 9 of the plant.

The shaft 1 of the guide wheel D carries a brake drum 10 cooperating with the brake band B to keep shaft 1 stationary. The brake drum 10 is also combined with a clutch L of the friction type by means of which the brake drum 10 and thus the shaft 1 may be connected to the ring gear 5 meshing with the long planet wheel 7.

The plant described may be used for vehicle drive and operates in the following manner.

During start of the vehicle the brake B and the clutch L are disengaged and the guide wheel D and turbine wheel T rotate in opposite directions and the torques from the two shafts 1 and 2 are transmitted to the output shaft 9 through the planet wheels 8. Due to the fact that these planet wheels are of the stepped type there is at the same time obtained a reduction of the speed. During the acceleration under this condition of operation the efficiency increases with increasing speed until a maximum is reached. At further increase of the speed the efficiency begins to decrease. When the speed corresponding to maximum efficiency under counter-rotation has been passed the guide wheel D is braked by engaging of the brake B. Thereafter the turbine unit operates as a simple mono-wheel turbine and to begin with the efficiency again increases with increasing speed and then passes a maximum value. Now the brake B is disengaged and the clutch L engaged so that the guide wheel D is driven by the turbine wheel T in the same direction as the latter. This provides for a further condition of operation during which the efficiency likewise increases with increasing speed.

From the above it is evident that there are three different conditions of operation so that it is possible to select that condition which at the actual load and speed has the highest efficiency. Automatic means may be provided for adjustment of the plant between the different conditions of operation, for instance a hydraulic control system known per se.

At the transition from counter-rotation to single rotation the guide wheel D must be retarded to still-stand. By providing a hydro-dynamic brake between the shaft 1 and the stationary turbine casing the main portion of the kinetic energy of the guide wheel D may be absorbed by filling said brake. In this case the friction brake may have considerably smaller dimensions than if used alone and may be calculated only to withstand the reaction torque acting upon the stationary guide wheel D.

If there is provided a hydrodynamic brake in the manner described it may be utilized as an auxiliary brake for the vehicle when the plant is operating in the third condition, that is, when the clutch L is engaged.

Figure 2:
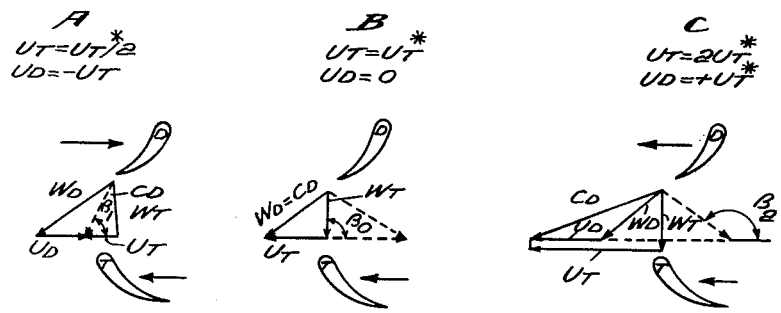
FIG. 2 shows velocity diagrams at the outlet from the guide wheel corresponding to the different conditions of operation, and FIG. 3 an appertaining loss curve.

In FIGURE 2 there are shown velocity diagrams of the flow between the guide wheel D and the turbine wheel T in the three different conditions of the plant. Letter U indicates the peripheral velocity, W and C the relative and absolute velocity of the gas, respectively, indices D and T indicating relation to the guide wheel and turbine wheel respectively. $U_T^*$ denotes the peripheral velocity of the turbine wheel at which maximum efficiency is obtained when the guide wheel D is stationary.

In FIGURE 2 letters A, B, and C indicate the three different conditions of operation with increasing turbine wheel speed, the velocity diagrams being shown for counter-rotating guide wheel and stationary guide wheel in FIGURES 2A and 2B, respectively, while FIG. 2C illustrates the condition when the guide wheel is driven by the turbine wheel in the same direction as the latter. According to FIG. 2A the two wheels are rotating in opposite directions with a peripheral velocity which is half as large as the above mentioned peripheral velocity $U_T^*$. As appears the relative velocity $W_T$ of the gases approaching the turbine wheel is perpendicular to the direction of the movement of the turbine blades. According to FIG. 2B the guide wheel D is stationary and the turbine wheel T rotates with the peripheral velocity $U_T^*$. Also in this case the relative velocity $W_T$ is perpendicular to said direction of movement. In the third case C the peripheral velocity of the turbine wheel T is equal to $2U_T^*$ while the peripheral velocity of the guide wheel D is equal to $U_T^*$. In spite of the high peripheral velocity of the turbine wheel the gases approach the turbine blades at right angles due to the fact that the guide wheel is rotating in the same direction as the turbine wheel.

Figure 3:
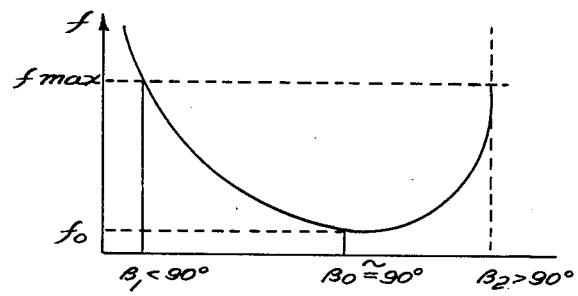

FIG. 3 illustrates a loss curve for a turbine blading according to FIG. 2. $f_{max}$ denotes the allowable maximum flow loss and $f_0$ indicates the minimum flow loss in the blading. In the example shown the losses have their lowest value at an angle of approach $\beta_0$ of about 90° while the losses increase above allowable values if the angle of approach is less than $\beta_1$ or larger than $\beta_2$.

From a comparison of FIGS. 2 and 3 it will be seen that the losses have their lowest value under the condition according to FIG. 2B in which the guide wheel D is stationary. Should the guide wheel be stationary also under the conditions according to FIGS. 2A and 2B the approach angles would have the values $\beta_1$ and $\beta_2$, respectively. The losses in the turbine wheel T would then be very high. By causing the guide wheel D to rotate in the opposite direction to and in the same direction as the turbine wheel, respectively, it is possible also under these two conditions to bring the gases to approach the turbine wheel at right angles and thus to decrease the losses in the turbine wheel D to their lowest value.

What I claim is:

1. A gas turbine plant comprising a gas producer and a useful power turbine, said power turbine including a turbine wheel and a rotatable guide wheel, and a planetary transmission connecting said guide wheel to said turbine wheel to provide for at least two different conditions of operation of the turbine, said transmission comprising two sun gears of different diameters, one sun gear being connected to the shaft of said rotatable guide wheel and the other sun gear being connected to the shaft of said turbine wheel, and a stationary planet carrier including at least two planet gears mounted thereon, one of said planet gears being meshed with the larger diametered sun gear and being elongated so as to engage the other planet gear which is meshed with the smaller diametered sun gear.

2. A gas turbine plant as claimed in claim 1 wherein the planet gear meshing with the smaller sun gear has two parts of different diameters, the large diameter part being in mesh with the other planet gear, and the small diameter part being connected with the output shaft by means of a ring or sun gear.

3. A gas turbine power plant comprising a first turbine, a compressor driven by said first turbine, a combustion chamber, means for conveying air compressed by said compressor to said combustion chamber and for conveying combustion gases from said combustion chamber as motive fluid to said first turbine, a second turbine including a rotatable guide wheel and a turbine wheel, means for conveying gases leaving said first turbine to said second turbine, a planetary gearing comprising a stationary planet carrier, at least two planet wheels journalled in said carrier and meshing with each other, a first sun gear meshing with one of said planet wheels and a second sun gear meshing with the other of said planet wheels, a gear wheel meshing with one of said planet wheels, said guide wheel and said turbine wheel of said second turbine being connected one to each of said sun gears, an output shaft connected to said gear wheel, a free-wheel device provided between said first sun gear and said guide wheel and permitting transfer of torque from said guide wheel to said turbine wheel of said second turbine via said planetary gearing, a brake for said guide wheel and a clutch device for connecting said turbine wheel via said planetary gearing to said guide wheel to drive said guide wheel in the same direction as said turbine wheel.

4. A gas turbine power plant according to claim 3 and further comprising a ring gear meshing with the same planet gear as said first sun gear, said clutch device being located between said guide wheel and said ring gear.

5. A gas turbine power plant according to claim 4, wherein said gear wheel is a ring wheel.

No references cited.